(12) United States Patent
Trudeau

(10) Patent No.: US 8,374,622 B2
(45) Date of Patent: Feb. 12, 2013

(54) CALL ADMISSION CONTROL FOR WI-FI

(75) Inventor: Pierre Trudeau, Lorraine (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 1461 days.

(21) Appl. No.: 11/955,055

(22) Filed: Dec. 12, 2007

(65) Prior Publication Data

US 2008/0146240 A1 Jun. 19, 2008

Related U.S. Application Data

(60) Provisional application No. 60/874,613, filed on Dec. 13, 2006.

(51) Int. Cl.
*H04W 72/00* (2009.01)
*H04L 12/28* (2006.01)

(52) U.S. Cl. .................. 455/453; 370/395.2; 370/395.21

(58) Field of Classification Search ........ 455/452.1–453
See application file for complete search history.

(56) References Cited

U.S. PATENT DOCUMENTS

| | | | | |
|---|---|---|---|---|
| 6,487,183 | B1 * | 11/2002 | Lo et al. .......................... | 370/326 |
| 7,120,446 | B2 * | 10/2006 | Iwamura et al. ............... | 455/453 |
| 7,173,904 | B1 * | 2/2007 | Kim ................................. | 370/230 |
| 7,414,990 | B2 * | 8/2008 | Gilliland et al. ............... | 370/329 |
| 7,437,157 | B1 * | 10/2008 | Satapathy ................... | 455/435.1 |
| 7,512,068 | B1 * | 3/2009 | Ghaderi Dehkordi et al. ............................... | 370/230 |
| 7,865,193 | B2 * | 1/2011 | Lin et al. ........................ | 455/453 |
| 7,899,459 | B2 * | 3/2011 | Ishii et al. ...................... | 455/450 |
| 7,912,022 | B2 * | 3/2011 | Kostic et al. ................... | 370/338 |
| 2002/0102986 | A1 * | 8/2002 | Iwamura et al. ............... | 455/453 |
| 2004/0208126 | A1 * | 10/2004 | Wassew et al. ................ | 370/235 |
| 2004/0213153 | A1 * | 10/2004 | Nagato et al. .................. | 370/230 |
| 2005/0037769 | A1 * | 2/2005 | Jami et al. ...................... | 455/453 |
| 2007/0097862 | A1 * | 5/2007 | Moon et al. .................... | 370/230 |

FOREIGN PATENT DOCUMENTS

WO  WO2005/048636 A1 *  5/2005

* cited by examiner

*Primary Examiner* — Huy C Ho

(57) ABSTRACT

Call admission control within a wireless network is implemented using a service controller that manages a set of access points. The call admission control (CAC) function for a given access point determines whether the access point has sufficient unused bandwidth to handle an additional call. The service controller makes this determination by monitoring the access points and evaluating certain probability functions and load conditions. In one embodiment, a determination of whether the access point has sufficient unused bandwidth to handle an additional call is a function of two (2) independent probabilities: (i) a probability of an active session moving to the access point from one or more neighbor access points, and (ii) a probability of an idle mobile device already associated with the access point entering into a new active session by initiating an inbound or outbound call. According to another aspect, the service controller issues and manages "call admission credits" among the set of access points, where a call admission credit value indicates a number of calls that idle mobile devices associated with the access point may initiate from the AP. The call admission credits value is a function of a determined load on the AP, and a mobility probability, which is a probability of an active call moving to the access point from one or more neighbor access points. The call admission credit value for the access point is adjusted as a function of a change of the load or in the mobility probability.

25 Claims, 2 Drawing Sheets

CALL ADMISSION CONTROL FOR WI-FI

This application is based on and claims priority to Ser. No. 60/874,613, filed Dec. 13, 2006.

BACKGROUND OF THE INVENTION

1. Technical Field

The present invention relates generally to wireless device networking and, in particular, to a method for call admission control in a wireless network.

2. Background of the Related Art

Wireless local area network (WLAN) technologies and services are well-known. WLAN is based on IEEE 802.11 standards. The Enhanced Distributed Channel Access (EDCA) defined in IEEE 802.11e allows multiple admission classes or classes of service (voice, video, best effort and, background) to be used to reflect the jitter and latency requirements of a specific application or service. While EDCA ensures a Quality of Service (QoS) marking of each 802.11 data frame, it is not sufficient to guarantee the required quality of service for an entire user session when the Wi-Fi user device moves among the access points (APs) comprising the Wi-Fi infrastructure.

The IEEE 802.11e standard also provides for Call Admission Control (CAC). The basic formula for the CAC function is based on the calculation of the airtime needed by a new user flow. In particular, if time occupied by the new flow is smaller than a surplus time, then communication with that priority is considered to be possible and the communication is approved. Otherwise, the communication is rejected. Thus, the main purpose of the CAC function is to determine whether there are adequate resources to provide the required quality for the service requested by a Wi-Fi user device.

BRIEF SUMMARY OF THE INVENTION

Given the desire to facilitate seamless mobility at all times, a CAC process needs to recognize that user devices associated with a given access point are likely to move about within the Wi-Fi infrastructure and that is it highly desirable (or even essential for some applications) to preserve the service (referred to herein as a call or session) for its entire duration. This disclosure describes a call admission control scheme in which resources required for the entire life of a call are reserved in such a way to preserve the call, even as a user device is moving between access points across the infrastructure.

In an illustrative embodiment, call admission control within a wireless network is implemented using a service controller that manages a set of access points. The call admission control (CAC) function for a given access point determines whether the access point has sufficient unused bandwidth to handle an additional call. The service controller makes this determination by monitoring the access points and evaluating certain probability functions and load conditions. In one embodiment, a determination of whether the access point has sufficient unused bandwidth to handle an additional call is a function of two (2) independent probabilities: (i) a probability of an active session moving to the access point from one or more neighbor access points, and (ii) a probability of an idle mobile device already associated with the access point entering into a new active session by initiating an inbound or outbound call. Although the CAC determination may be based on either of the above probabilities, preferably it is based on both probabilities, as well as AP load determinations. A particular AP load may be a function of an Erlang value, where the Erlang value is a theoretical maximum load (a number of simultaneous calls expected per admission class) across the set of access points.

According to another aspect, the service controller issues and manages "call admission credits" among the set of access points, where a call admission credit value indicates a number of calls that idle mobile devices associated with the access point may initiate and that can be accepted by the AP. The call admission credits value is a function of a determined load on the AP, and a mobility probability, which is a probability of an active call moving to the access point from one or more neighbor access points. The call admission credit value for the access point is adjusted as a function of a change in the mobility probability.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

Figure 1:
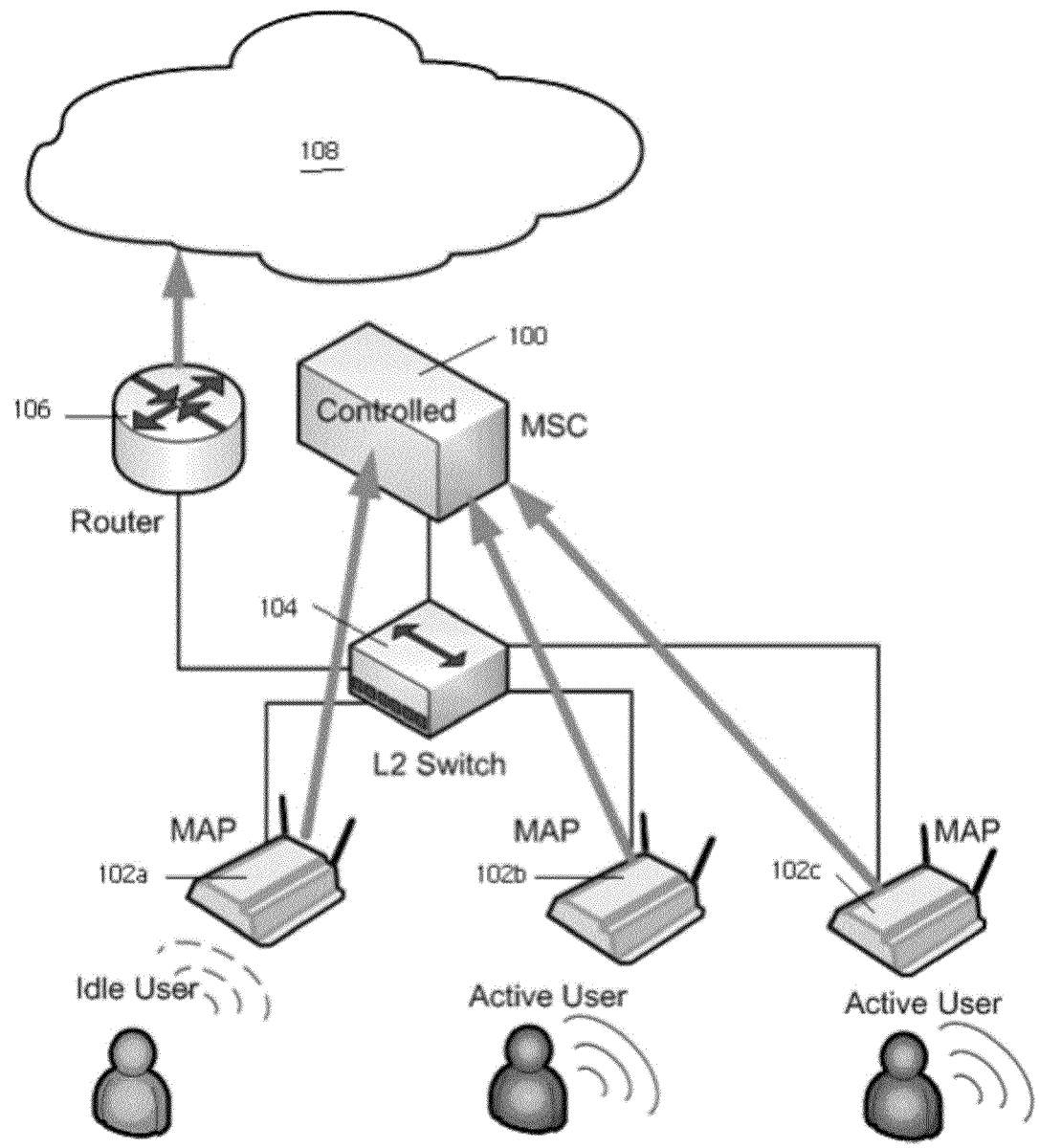
FIG. 1 illustrates a wireless network comprising a service controller and a set of access points that are managed by the service controller and in which the CAC scheme of this disclosure is implemented.

In a representative embodiment, such as seen in FIG. 1, wireless infrastructure topology comprises a set of access points 102a-c that are managed by at least one or more service controllers, one of which is shown by reference numeral 100. A representative service controller 100 is a MultiService Controller (MSC) available from Colubris Networks, Inc. of Waltham, Mass., although this is not a limitation of the invention. Any WLAN service controller or equivalent device may be used. A given service controller of this type manages a large number of (e.g., up to 1000) access points, and the services controllers can be connected to one another through routers and switches to form a large topology. The access points typically connect to the service controller through a L2 switch 104, which itself connects to a router 106 and to the public Internet 108. Of course, the number of access points and controllers will depend on the physical constraints of the facilities in which the infrastructure is implemented. The Wi-Fi infrastructure may include or have associated therewith a server that performs RADIUS-compliant AAA services. The service controller may be implemented in any convenient manner, such as a personal computer, a server, or similar machine. A representative service controller is a rack-mounted PC running a Linux 2.4 (or equivalent) operating system kernel on a Pentium (or equivalent) processor, and the device includes system memory and external storage for supporting software applications and associated data. The service controller also includes standard network interfaces (Ethernet ports) to facilitate the functions described below. The controller typically exports a web-based (or equivalent) interface for administration, management and monitoring.

A representative access point (AP) includes various software modules executing on a hardware and software platform, and suitable networking support. It must include at least one or more radios to facilitate the wireless connectivity. In a two radio configuration, a first radio typically is configured to be IEEE 802.11b+g compliant and the second radio is configured to be IEEE 802.11a compliant. Typically, a radio in the AP also is compliant with the IEEE 802.11n standard. Alternatively, the radio may comprise multiple radio modules each of which being a/b/g compliant. A software-configurable dual-band radio structure of this type is merely illustrative, as it allows users with different hardware requirements to connect to the device simultaneously and to share the AP resources. The access point typically comprises a WLAN port and one or more LAN ports. A representative access point is a MultiService Access Point (MAP) available from Colubris Networks, Inc., although any AP or equivalent device may be used.

A service controller includes program code for establishing and maintaining secure management tunnels to each of the access points that are being managed by the controller. A secure management tunnel may be any secure communication link (e.g., an open VPN tunnel, an IPsec tunnel, a GRE tunnel), or any TLS-compliant (or equivalent) encryption wrapper. Of course, the access points include control programs to facilitate these secure communications links. As a consequence, data is transmitted through a management tunnel between the service controller and access point in a bi-directional, encrypted manner. Message protocols and associated communication techniques for a wireless infrastructure of this type are described in Ser. No. 11/646,904, filed Dec. 28, 2006, and titled "Seamless roaming across wireless subnets using source address forwarding," the disclosure of which is incorporated by reference herein in its entirety.

As used herein, the following terms shall have the following meaning:

QSTA: a user mobile device that supports the IEEE 802.11e standard and can make use of TSPEC, a mechanism defined as part of the EDCA method;

STA: a legacy user device that does not support the IEEE 802.11e standard, although it may optionally support other QoS protocols, such as Differentiated Services (DiffServ) [RFC2474 and RFC2475] that operates at Layer-3;

QAP: an Access Point that supports the IEEE 802.11e standard and fully supports the TSPEC mechanism defined as part of the EDCA method;

AP: a legacy AP that does not support the IEEE 802.11e standard;

Contention Window (CwMin and CwMax): the CWmin and CWmax parameters that control the contention window mechanism used as part of the CSMA/CA protocol.

Short Inter Frame Space (SIFS): used for ACK frame or subsequent MPDU transmission in bulk transmission mode;

AC-VO: admission class for voice applications;
AC-VD: admission class for video applications;
AC-BE: admission class for best effort applications (this is a default class); and
AC-BK: admission class for background applications.

In addition, where a given access point is sufficiently close to an access point such that a mobile device is movable from the given access point to the access point without losing signaling or connectivity, the given access point may be considered to be a "neighbor access point." Thus, as used herein, an access point may have one or more neighbor access points depending on the geographic separation and wireless coverage of the access points in the wireless network. The service controller includes control routines for generating a graph of the neighbors of a given access point. A neighbor graph identifies prospective APs to which a mobile station may roam in the infrastructure. Using neighbor graphing techniques, the service controller maintains a view of the infrastructure and individual AP load as mobile devices roam across access points. A technique for generating and maintaining neighbor graphs is described in Ser. No. 11/430,547, filed May 9, 2006 (U.S. Publication No. 20060256763), and titled "Fast roaming in a wireless network using per-STA pairwise master keys shared across participating access points," the disclosure of which is incorporated by reference herein in its entirety. Finally, a mobile device is said to be associated with an access point upon authentication to the access point. The associated mobile device is said to be "idle" upon association if it is not then initiating a call (either inbound or outbound).

A service controller 200 and its associated access points 202 as shown in FIG. 1 are compliant with and capable of implementing IEEE 802.11 wireless network standards. A QAP provides the call admission control functionality specified in IEEE 802.11e. As noted above, the IEEE 802.11e standard provides a basic formula for the CAC function. It is based on the calculation of the airtime needed by a new user flow. If time occupied by the new flow ($T_{mt}$) is smaller than a surplus time, then communication with that priority is considered to be possible and the communication is approved. Otherwise, the communication is rejected. New flow occupation time $T_{mt}$, accepted admission flow occupation time $T_{used}$, and surplus time $T_s$ are represented as set forth in the following equations:

$$T_{mt} = (\text{SurplusBandwidthAllowance}) * (pps) * (T_{MPDU})$$

where $$pps = \text{ceiling}(\text{MeanDataRate}/8)/\text{NominalMSDUSize}$$

$$T_{MPDU} = (\text{Data} + \text{SIFS} + \text{ACK})$$

$$T_{used} = \Sigma T_{mt[AC\text{-}VO]} + \Sigma T_{mt[AC\text{-}VD]} + \Sigma T_{mt[AC\text{-}BE]} + \Sigma T_{mt[AC\text{-}BK]}$$

$$T_s = 1 - T_{used}$$

NOTE: preferably, the above formula is adjusted at regular intervals to reflect the "real" DataRate from each STA and QSTA in a given class of service;

NOTE: for STA, the $T_{mt}$ value is calculated based on the default QOS assigned to the Virtual AP (BSSID).

Figure 2:
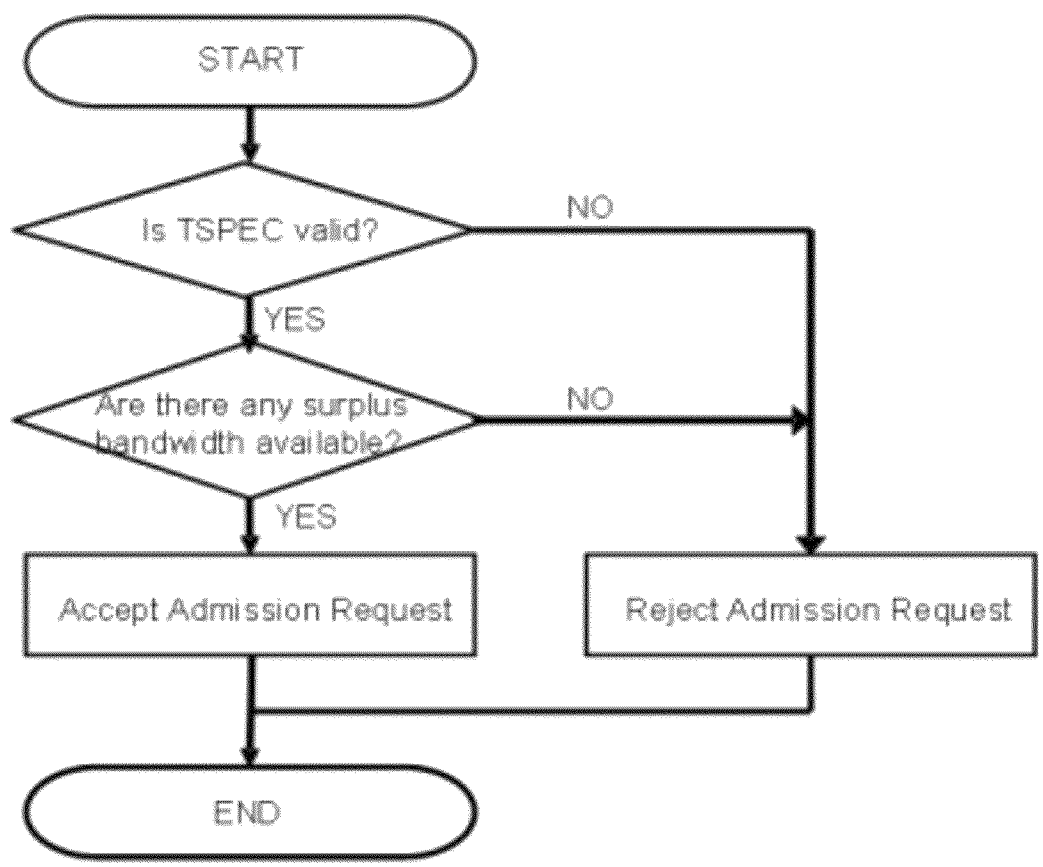
FIG. 2 is a process flow illustrating a known call admission control (CAC) function of IEEE 802.11e.

The above formula (defined in the 802.11e standard) is then used with the process flow shown in FIG. 2 to determine if a new user flow can be accepted or not.

The CAC algorithm in IEEE 802.11e is defined only for a single AP. The remainder of this disclosure extends the concept of how much of the medium (air time) is available to handle a new user session (or call) whether it is initiated by the Wi-Fi user device or is destined for the user device (call request is incoming). In particular, the extended CAC technique described herein takes into consideration the need to preserve a user session as the user device moves about the Wi-Fi infrastructure. The centralized service controller facilitates this operation by offering a comprehensive view about the state of the entire network.

When calculating whether an AP (here, AP typically refers to a QAP) has enough unused medium time to handle a new user session or call, it is desirable to take into account the level of activity of nearby access points, because user devices may decide to handover (move) to the current AP. As described herein, this level of activity is influenced mostly by the probability of an active call moving to the current AP. This probability is referred to herein as a "mobility probability."

It is also desirable to take into account the expected call activity for the entire (or some given portion of the) infrastructure and, more specifically, an immediate neighborhood of the current AP. The call activity is also known as Erlang. The notion of an Erlang is useful to provision the resources required to support the planned level of activity. It is particularly useful when attempting to determine the probability of idle user devices entering into an active session based on the current level of activity. For instance, when the level of activity is low and there are a lot of idle user devices, the probability of a new call (inbound or outbound) being established is higher than when the level of activity for a service is at or near the maximum configured Erlang value.

A controlled AP preferably relies on its controlling service controller to determine whether a request for a new call or session from a user device is acceptable or not. As defined by the IEEE 802.11e specification, the decision factor is the "medium time," which according to this disclosure preferably is calculated by taking into consideration the load of the current AP, the probability of an active call to move to the current AP, and the probability of a new call being initiated.

The following set of equations reflects these considerations.

$$Total\_Ts[curr\_AP]=1-T\_Tres[curr\_AP]$$

where:
Total_Ts: represents the remaining bandwidth available for a specific AP across all of the admission classes;
T_Tres: represents the total reserved bandwidth for all admission classes of a specific AP;
Curr_AP: represents the current AP.

Preferably, the total medium time is calculated based on the load on the current AP as well as the level of activity (actual or potential) within the AP neighborhood, including the current AP. The following equation is used.

$$T\_Tres[curr\_AP]=Tused[curr\_AP]+\Sigma_{(AP=1\ to\ N)}Tidle\_to\_call[AP]+\Sigma_{(AP=1\ to\ N)}Tmovers[AP]$$

where:
Tused: represent the currently allocated and used bandwidth for an AP;
Tidle_to_call: represents the bandwidth that shall be reserved to take into account idle stations on neighbor APs that may enter a new session (call). This is needed to reflect that these new sessions may eventually result into a move (handover) and therefore impact available resources on the current AP;
Tmovers: represents the bandwidth that shall be reserved to take into account user devices with active sessions (calls) on neighbor APs that may decide to move (handover) to the current AP. This is needed to reflect that these sessions may move to the current AP and will therefore impact available resources on the current AP.

The medium time currently in use for a specific AP is defined as follows:

$$Tused[AP]=\Sigma_{(AC=1\ to\ 4)}Tmt[AP][AC]$$

where:
Tused: represents the currently allocated and used bandwidth for the specified AP
Tmt: represents the medium time or the bandwidth allocated and used by a session in the specific admission class for the specified AP.

Note: this equation is defined as part of the 802.11e standard specification
Note: It is desirable to set the minimum 802.11 rate to a value representative of the desired performance for the size of cell deployed. This is to avoid situations where a single device operating at the minimum speed impacts all other devices capable of operating at significantly higher speeds. As a basic guideline, the RF coverage of a cell should be set to provide a bandwidth of at least 5.5 Mbps.

$$Tmt[AP][AC]=SurplusBandwidthAllowance \times PPS[AP][AC] \times Med\_Time\_per\_frame[AP]$$

where:
Tmt: represents the medium time or the bandwidth allocated and used by a session in the specific admission class for the specified AP;
SurplusBandwidthAllowance: is defined by the IEEE 802.11e specification and represents any additional overhead that should be taken into account at the MAC layer protocol layer to transport an MSDU for the current admission class;
PPS: represents the expected number of Packets per Second for the specified AP and admission class;
Med_Time_per_frame: represents the duration of the transmission of a frame for the specified AP. This is calculated at the lowest acceptable transmit speed to take into account user devices (STA) that may operate at a lower transmit rate.

Note: this equation is defined as part of the 802.11e standard specification $$PPS[AP][AC]=Ceiling(MeanDataRate[AP][AC]/8)/NominalMSDUsize$$

where:
PPS: represents the expected number of Packets per Second for the specified AP and admission class;
MeanDataRate: represents the transmit speed in bits per seconds for the specified AP and admission class;
NominalMSDUsize: represents the size of the MSDU in bytes.

Note: this equation is defined as part of the 802.11e standard specification $$Med\_Time\_per\_frame[AP]=duration(NominalMSDUsize,min\_PHY\_rate[AP])+SIFS+ACK\_duration[AP]$$

where:
Med_Time_per_frame: represents the duration of the transmission of a frame for the specified AP. This is calculated at the lowest acceptable transmit speed to take into account user devices (STA) that may operate at a lower transmit rate
Duration: is a PLME_TXTIME primitive defined by the 802.11 standard. It represents the duration of a frame transmission based on the payload and the PHY rate;
NominalMSDUsize: represents the size of the MSDU in bytes;
Min_PHY_rate: represents the minimal (worst case scenario) transmission speed in bits per seconds for the specified AP;
SIFS: represents the Short InterFrame Space as defined by the 802.11 standard;
ACK_duration: represent the time used to transmit an ACK frame for the specified AP.

Note: this equation is defined as part of the 802.11e standard specification

Calculating Load from New Calls Established by Idle User Devices in the AP Neighborhood The potential load on the current AP arising out of idle stations becoming active within the AP neighborhood preferably is determined via the following equation.

$$Tidle\_to\_call[AP]=\Sigma_{(AC=1\ to\ 4)}(Pidle\_to\_call[AP][AC] \times T\_idle\_sta[AP][AC] \times Tmt[AP][AC])$$

where:
Pidle_to_call: represents the probability of an idle associated STA on a neighbor AP to enter into a call (or QOS session);
T_idle_sta: this represent the number of idle user devices (STA) for the specified AP and admission class;
Tmt: represents the medium time or the bandwidth allocated and used by a session in the specific admission class for the specified AP.

$$P\text{idle\_to\_call}[_{current\_AP}][_{AC}] = \text{ceiling}(0,((\text{ERLANG}[_{AC}]\Sigma_{(AP=1\ to\ N)}$$

$$T\_\text{Active\_Calls}[_{AP}][_{AC}])/\Sigma_{(AP=1\ to\ N)}T\_\text{idle\_sta}[_{AP}][_{AC}]))$$

Note: if there are no idle stations in the AP neighborhood, then Pidle_to_call is set to 0
where:
Pidle_to_call: represents the probability of an idle associated STA on a neighbor AP to enter into a call (or QOS session) for a given admission class (AC) and specified AP;
ERLANG: this represents the maximum number of simultaneous calls expected (and allowed) per admission class across the entire domain (or portion thereof) covered by the service controllers and their respective controlled AP devices;
T_Active_Calls: represents the number of active sessions (or calls) for a specific AP and a specific admission class for a specific AP;
T_idle_sta: this represents the total number of idle user devices (STA) for a specific admission class (AC) for a specific AP.

Calculating Load from Active Calls from User Devices in the AP Neighborhood

Finally, the following equations are used to reserve adequate resources to handle the eventual move of a call from a neighbor of the current AP. The probability of a move preferably is based on the load of the neighbor APs coupled with historical and trend information. Typically, the probability of a session moving between APs is not uniform during the course of a day and needs to be taken into account to avoid over reservation and therefore possibly prevent the acceptance of calls while resources are indeed available.

$$T\text{movers}[_{AP}] = \Sigma_{(AC=1\ to\ 4)}(P\text{mob}[_{AP}][_{AC}] X T\text{mt}[_{AP}][_{AC}])$$

where:
Pmob: represent the probability a user device (STA) currently associated to a neighbor AP will handover to the current AP
Tmt: represents the medium time or the bandwidth allocated and used by a session in the specific admission class for the specified AP.

$$P\text{mob}[_{AP}][_{AC}] = T\_\text{Active\_Calls}[_{AP}][_{AC}] X \text{Mover\_Ratio}[_{AP}][_{AC}][\text{Curr}_{Period}]$$

where:
Pmob: represent the probability a user device (STA) currently associated to a neighbor AP will handover to the current AP;
T_Active_Calls: represents the number of active sessions (or calls) for a specific AP and a specific admission class on that AP;
Mover_Ratio: represents the historical (or defined) ratio of current user devices for a specific AP and admission class at a specific period of the day;
Curr_Period: represents the current period of time.

$$\text{Mover\_Ratio}[_{AP}][_{AC}][_{Period}] = T\_\text{Active\_Calls\_that\_moved}[_{AP}][_{AC}][_{Period}] / T\_\text{Active\_Calls\_Period}[_{AP}][_{AC}][_{Period}]$$

where:
Mover_Ratio: represents the historical (or defined) ratio of current user devices for a specific AP and admission class at a specific period of the day
T_Active_Calls_that_moved: represents the number of active sessions (or calls) for a specific AP and a specific admission class on that AP that moved (handover) to another AP in the neighborhood of the current AP
T_Active_Calls_Period: represents the number of active sessions (or calls) for a specific AP and a specific admission class on that AP for a specific period.
Period: indicates the period of time. A recommended period duration is 30 minutes. The activity data may be retained for a given time (e.g., a week) to reflect variations between period of activities and between days of the week. The sampling period preferably is selected by taking into account the amount of data it may generate. For instance, using 30 minutes samples generate 48 samples per day, 336 samples per 7-days weeks and 1488 samples per 31-days months. This number of samples is then multiplied by the number of admission classes (AC) being sampled (up to 4 with 802.11e). This number should then be multiplied by the number of APs sampled to achieve the total storage need for the service controller appliance.

Control Requirements Between Service Controller and Access Point

There is a need for the service controller to obtain load information from each AP, preferably in real-time. The service controller shall also be able to re-calculate the load of affected APs whenever events that may impact the load of one or more AP devices take place. Such events include, for example, the initiation or termination of a call (session); for a QSTA, preferably, this is indicated by ADDTS and DELTS requests from the QSTA. Other events of relevance include association and re-association requests, as well as de-authentication/de-register messages.

There is also a need for the service controller to provide guidance to the AP with regards to the call admission control function without creating a real-time dependency between the AP and the controller. This means that the AP shall be able to take a proper decision under the proactive guidance of the service controller rather than being forced to wait for the controller to perform the CAC calculations. To this extent, the controller is expected to issue a number of call admission credits to each AP to control the number of additional calls (or sessions) it may accept without further notice from the controller. This operation may occur at any convenient time, or in response to a given condition. At some later time, the controller also is notified of any changes in the load of the access point so that, as necessary, the controller can adjust the number of remaining call admission credits (upward or downward), e.g., based on changes in the mobility probability and/or the calculated or anticipated load on the access point (or set of access points).

TSPEC Emulation from Access Point to Service Controller

While the ADDTS and DELTS primitives can be used as event triggers by the AP to communicate with the service controller, the communication mechanism also needs to be usable for legacy STA. This mechanism shall also minimize the processing required on the AP. To this extent, the AP shall emulate the TSPEC mechanism for devices that do not support 802.11e. This is to allow the service controller to be able to support various APs as is without requiring modification to the AP implementation. The basic idea is for the AP to monitor any sudden increase in the volume of user traffic which indicates a new call is in place and to report the event as if an ADDTS message had been received by the device. Similarly, a sustained drop in the traffic (analogous to an idle situation resulting from the termination of a call) would trigger the AP to report the event as a DELTS message to the service controller. This allows the service controller to continuously monitor the actual load of the Wi-Fi infrastructure and to perform various calculations to better handle future load. A legacy STA can only handle a single QoS stream because there are no ways to reliably identify different flows or sessions. On the other hand, a QSTA can handle multiple concurrent QoS sessions, each controlled by their respective traffic specification (TSPEC).

The subject disclosure provides numerous advantages. Call admission control operations are enabled across the infrastructure, taking into consideration the goal to preserve a call for its entire duration during any inter-AP mobility event. Using these techniques, the total number of calls (voice, video, others) can be optimized per access point and for the entire Wi-Fi infrastructure. The CAC function is able to handle the 4 classes of service defined in the 802.11e/WMM standard, even as mobile devices move across access points. The CAC function provides network management visibility into the performance and usage levels per access point, per service controller and for the overall Wi-Fi infrastructure. Preferably, the controller (or its equivalent) is the focal point for the CAC function to reduce the complexity of the firmware on the AP and to be able to operate across the entire Wi-Fi infrastructure (or some portion thereof) at any given location.

The CAC implementation ensures that resources allocated to a call take into account any inter-AP mobility event, and such an event shall not result into a dropped call (due to lack of resources of an AP or of the Wi-Fi infrastructure). The CAC implementation may be used as the foundation to offer load balancing across the Wi-Fi infrastructure for various services, including, but not limited to, access control for guests or visitors. The CAC implementation described herein also improves the resiliency of the Wi-Fi infrastructure by allowing a user device to handover to a neighbor AP, should an AP fail, without losing active calls. The CAC implementation leverages the Traffic Specification (TSpec) method of 802.11e, yet it also provides the same services for any legacy (does not support WMM/802.11e) wireless client device. The CAC implementation may be used with any application or signalling protocol and does not impact the behaviour of these protocols(s).

While aspects of the present invention have been described in the context of a method or process, the present invention also relates to apparatus for performing the operations herein. As has been described above, this apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the above-described subject matter is software written in a given programming language that runs on a server, machine or other device on a standard Intel hardware platform running an operating system such as Linux.

While given components of the system have been described separately, one of ordinary skill will appreciate that some of the functions may be combined or shared in given instructions, program sequences, code portions, and the like.

Finally, while the above text describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Having described my invention, what I now claim is as follows.

The invention claimed is:

1. A method of call admission control operative within a wireless network having a set of access points, comprising:
   in response to a call admission control request received at an access point from a mobile device, determining whether the access point has sufficient unused bandwidth to handle an additional call; and
   if the access point has sufficient unused bandwidth to handle the additional call, accepting the CAC request;
   wherein the determination of whether the access point has sufficient unused bandwidth is a function of (i) a probability of an active session moving to the access point from one or more neighbor access points, and (ii) a probability of an idle mobile device associated with the access point entering into a new active session.

2. The method as described in claim 1 wherein the probability of an active session moving to the access point from a given neighbor access point of the one or more neighbor access points is a function of a number of active sessions for the given neighbor access point for a given admission class.

3. The method as described in claim 2 wherein the probability of an active session moving to the access point also is a function of a value that represents a historic or defined ratio of a number of current mobile devices for the given neighbor access point and the admission class over a given time period in a day.

4. The method as described in claim 3 wherein the probability of an active session moving to the access point is represented by the following:

$$Pmob[AP][Ac] = T\_Active\_Calls[AP][Ac] \times Mover\_Ratio[AP][AC][Curr\_Period]$$

where:
Pmob: represent the probability a user device currently associated to the neighbor access point will handover to the access point;
T_Active_Calls: represents the number of active sessions for the access point and a specific admission class on the access point;
Mover_Ratio: represents a historical or defined ratio of current user devices for the access point and admission class at a specific period of the day;
Curr_Period: represents a current period of time; and $$Mover\_Ratio[AP][Ac][Period] = T\_Active\_Calls_{13} \text{ that\_moved}[AP][AC][Period] / T\_Active\_Calls\_Period[AP][Ac][Period]$$

where:
Mover_Ratio: represents the historical or defined ratio of current user devices for the access point and the admission class at the specific period of the day;

T_Active_Calls_that_moved: represents the number of active sessions for the access point and the admission class on that access point that moved to another access point in the neighborhood of the access point; and T_Active_Calls_Period: represents the number of active sessions for the access point and the admission class on that access point for the specific period of the day.

5. The method as described in claim 1 wherein the determination also is based on a load at the access point.

6. The method as described in claim 1 wherein the determination is made at a location other than at the access point that receives the call admission control request.

7. The method as described in claim 6 wherein the determination is made at a controller to which the access points are associated.

8. The method as described in claim 7 further including having the controller determine a potential load on the access point that is a function of an Erlang value, the Erlang value representing a maximum number of simultaneous active sessions per admission class across the set of access points.

9. The method as described in claim 1 wherein the access point is compliant with IEEE 802.11e.

10. The method as described in claim 1 wherein a neighbor access point is a given access point that is sufficiently close to the access point such that a mobile device is movable from the given access point to the access point without losing connectivity.

11. A controller for use in a wireless network, the network having a set of access points each having a predetermined service area, wherein mobile devices receive a communication service by associating with access points in the set, comprising:
a processor;
program code, executable by the processor, to implement a call admission control operation at an access point within the set of access points as a function of one or more of: (i) a probability of an active call moving to the access point from a neighbor access point, and (ii) a probability of an idle mobile device associated with the access point initiating a new call.

12. The controller as described in claim 11 wherein the new call is an inbound call or an outbound call.

13. The controller as described in claim 11 wherein the call admission control function is also based on a load at the access point.

14. The controller as described in claim 13 wherein the load at the access point is determined as a function of one or more admission classes.

15. The controller as described in claim 14 wherein the load is a function of an Erlang value.

16. The controller as described in claim 15 wherein the Erlang value is a maximum number of simultaneous calls expected per admission class across the set of access points.

17. The controller as described in claim 11 further including program code executable by the processor to establish and maintain a secure communication link to each of the access points in the set.

18. The controller as described in claim 11 further including program code executable by the processor to collect data from the access points, wherein the data is used to calculate the probabilities.

19. A system, comprising, in combination:
a set of access points each having a predetermined service area, wherein mobile devices receive a communication service by associating with access points in the set; and
a controller, comprising:
a processor;
program code, executable by the processor, to implement a call admission control operation at an access point as a function of one or more of: (i) a probability of an active call moving to the access point from a neighbor access point, and (ii) a probability of an idle mobile device associated with the access point initiating a new call.

20. The system as described in claim 19 wherein a given access point in the set of access points is compliant with IEEE 802.11 e.

21. The system as described in claim 19 wherein the controller further includes program code executable by the processor to establish and maintain a secure communication link to each of the access points in the set.

22. The system as described in claim 19 wherein the controller further includes program code executable by the processor to collect data from the access points, wherein the data is used to calculate the probabilities.

23. A method for issuing and managing call admission credits among a set of access points, comprising:
determining a load on an access point; and
issuing a call admission credit value to the access point as a function of the determined load and a mobility probability, wherein the call admission credit value indicates a probability of a number of calls that idle mobile devices associated with the access point may initiate and that can be accepted by the access point.

24. The method as described in claim 23 further including, at a later time, adjusting the call admission credit value as a function of a change in the mobility probability or the load on one of: the access point and the set of access points.

25. The method as described in claim 23 wherein the mobility probability is a probability of an active call moving to the access point from one or more neighbor access points.

* * * * *

UNITED STATES PATENT AND TRADEMARK OFFICE
CERTIFICATE OF CORRECTION

PATENT NO. : 8,374,622 B2
APPLICATION NO. : 11/955055
DATED : February 12, 2013
INVENTOR(S) : Pierre Trudeau It is certified that error appears in the above-identified patent and that said Letters Patent is hereby corrected as shown below:

In the Claims:

In column 10, lines 47-48, in Claim 4, delete "Pmob[AP][Ac]=T_Active_Calls[AP][Ac]XMover_Ratio[AP][Ac][Curr_Period]" and insert -- $Pmob_{[AP][Ac]}=T\_Active\_Calls_{[AP][Ac]}XMover\_Ratio_{[AP][Ac][Curr\_Period]}$ --, therefor.

In column 10, lines 61-63, in Claim 4, delete "Mover_Ratio[AP][Ac][Period]=T_Active_Calls that_moved[AP][AC][Period]/T_Active_Calls_Period[AP][Ac][Period]" and insert -- $Mover\_Ratio_{[AP][Ac][Period]}=T\_Active\_Calls\_that\_moved_{[AP][Ac][Period]}/T\_Active\_Calls\_Period_{[AP][Ac][Period]}$ --, therefor.

In column 12, line 26, in Claim 20, delete "802.11 e." and insert -- 802.11e. --, therefor.

Signed and Sealed this
Seventeenth Day of September, 2013

Teresa Stanek Rea
*Deputy Director of the United States Patent and Trademark Office*